United States Patent
Lee

(10) Patent No.: US 9,412,016 B2
(45) Date of Patent: Aug. 9, 2016

(54) DISPLAY DEVICE AND CONTROLLING METHOD THEREOF FOR OUTPUTTING A COLOR TEMPERATURE AND BRIGHTNESS SET

(71) Applicant: LG ELECTRONICS INC., Seoul (KR)

(72) Inventor: Jongdoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/540,666

(22) Filed: Nov. 13, 2014

(65) Prior Publication Data

US 2015/0156442 A1 Jun. 4, 2015

(30) Foreign Application Priority Data

Dec. 4, 2013 (KR) ........................ 10-2013-0149863

(51) Int. Cl.
| | | |
|---|---|---|
| H04N 5/445 | (2011.01) | |
| G06K 9/00 | (2006.01) | |
| H04N 5/57 | (2006.01) | |
| H04N 9/77 | (2006.01) | |
| H04N 1/407 | (2006.01) | |
| H04N 21/431 | (2011.01) | |
| H04N 9/73 | (2006.01) | |

(52) U.S. Cl.
CPC ........ G06K 9/00442 (2013.01); G06K 9/00456 (2013.01); H04N 1/407 (2013.01); H04N 5/57 (2013.01); H04N 9/73 (2013.01); H04N 9/77 (2013.01); H04N 21/4318 (2013.01)

(58) Field of Classification Search
CPC . G06K 2209/01; G06K 9/38; G06K 9/00442; G06K 9/00456
USPC ........................................ 348/563
See application file for complete search history.

(56) References Cited

U.S. PATENT DOCUMENTS

| | | | | |
|---|---|---|---|---|
| 5,373,371 A * | 12/1994 | Masui | ................. | H04N 1/3878 358/444 |
| 7,643,705 B1 * | 1/2010 | Erol | ................. | G06F 17/30056 382/305 |
| 2003/0185191 A1 * | 10/2003 | Nagatomo | .......... | H04L 12/5835 370/338 |
| 2004/0239970 A1 * | 12/2004 | Niitsuma | ........... | H04N 1/00681 358/1.9 |
| 2006/0061602 A1 * | 3/2006 | Schmouker | .......... | G11B 27/105 345/660 |
| 2006/0203275 A1 * | 9/2006 | Moro | ................. | H04N 1/00795 358/1.13 |
| 2006/0274388 A1 * | 12/2006 | Miyazawa | ......... | H04N 1/00411 358/527 |
| 2009/0210786 A1 * | 8/2009 | Suzuki | ............... | G06K 9/00456 715/243 |
| 2010/0158360 A1 * | 6/2010 | Dai | .................... | G06K 9/00456 382/164 |
| 2012/0162680 A1 * | 6/2012 | Mori | ................. | H04N 1/33315 358/1.13 |
| 2012/0288197 A1 * | 11/2012 | Adachi | ................... | G06T 7/001 382/167 |
| 2014/0063177 A1 * | 3/2014 | Tian | ........................ | H04N 7/15 348/14.07 |

* cited by examiner

*Primary Examiner* — Michael Lee
(74) *Attorney, Agent, or Firm* — Birch, Stewart, Kolasch & Birch, LLP

(57) ABSTRACT

A display device and an operating method thereof are provided. In the operating method of a display device, an input image is received externally. A first type signal of the input image is converted into a second type signal. A brightness component is extracted from the converted second type signal. Document image determination information is extracted based on the extracted brightness component and whether the input image to the display device is a document image is determined.

17 Claims, 9 Drawing Sheets

DISPLAY DEVICE AND CONTROLLING METHOD THEREOF FOR OUTPUTTING A COLOR TEMPERATURE AND BRIGHTNESS SET

CROSS-REFERENCE TO RELATED APPLICATIONS

The present application claims priority under 35 U.S.C. 119 and 35 U.S.C. 365 to Korean Patent Application No. 10-2013-0149863 (filed on Dec. 4, 2013), which is hereby incorporated by reference in its entirety.

BACKGROUND OF THE INVENTION

1. Field of the Invention

The present invention relates to a display device and an operating method thereof providing the color temperature proper to a document image in case where an image input to a display device is an image of a text-oriented document.

2. Discussion of the Related Art

Typically, a display device such as a TV or a monitor includes a control terminal for varying an amount of hue or an amount of red, green, blue (RGB) for conversion into a the color temperature desired by a user. The user can control the color temperature by controlling the control terminal with respect to an arbitrary image (scene). However, it is very inconvenient for the user to control the control terminal for each content scene of a moving picture having various content scenes.

Recently, a text-oriented document image is output by using a display device and a user performs various tasks through the document image. However, the user can feel eyestrain while performing the tasks through the document image and then he/she has to control the color temperature of the display device through additional user inputs. In addition, there are no explicit criterions on a method of determining whether an image input to a display device is a text-oriented document image.

SUMMARY OF THE INVENTION

Accordingly, one object of the present invention is to provide a display device and an operating method thereof efficiently determining whether an image input to the display device is a document image and providing the color temperature and brightness optimized to the document image.

In one embodiment, the present invention provides an operating method of a display device includes receiving an input image externally; converting a first type signal of the input image into a second type signal; extracting a brightness component from the converted second type signal; and extracting document image determination information based on the extracted brightness component and determining whether the input image to the display device is a document image.

In another embodiment, the present invention provides a display device including a display unit; a signal converting unit converting a first type signal of an image input externally into a second type signal; a brightness component extracting unit extracting a brightness component from the converted second type signal; and a control unit extracting document image determination information based on the extracted brightness component and determining whether the image input to the display device is a document image by using the extracted document image determination information.

The details of one or more embodiments are set forth in the accompanying drawings and the description below. Other features will be apparent from the description and drawings, and from the claims.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Reference will now be made in detail to the embodiments of the present invention, examples of which are illustrated in the accompanying drawings.

In the following description, usage of suffixes such as 'module' or 'unit' used for referring to elements is given merely to facilitate explanation of the present invention, without having any significant meaning by itself. It should be noted that 'module' and 'unit' can be substitutively, alternatively or mixedly used.

A display device and an operating method thereof according to an embodiment will be described in detail with reference to the accompanying drawings. The invention can, however, be embodied in many different forms and should not be construed as being limited to the embodiments set forth herein; rather, that alternate embodiments included in other retrogressive inventions or falling within the spirit and scope of the present invention can easily be derived through adding, altering, and changing, and will fully convey the concept of the invention to those skilled in the art.

A display device according to an embodiment is an intelligent device that a computer supporting function is added to, for example, a broadcast receiving function, and can have an additional internet function other than the broadcast receiving function and include an interface, such as a input device having a handwriting scheme, a touch screen, or a spatial remote control, which is convenient to use. The display device can also be connected to the internet and a computer in support of a wired or wireless internet function to be able to perform a function, such as email, web browsing, banking or game. For performing these various functions, a standardized general purpose operating system (OS) can be used.

Accordingly, in a display device described herein, for example, user-friendly various functions can be performed, since various applications can be freely added to or deleted from a general purpose OS kernel. In more detail, the display device can be a network TV, a hybrid broadcast broadband (HBB) TV, a smart TV, an LED TV, or an organic light emitting device (OLED) TV, and is applicable to a mobile terminal, a PC, or a laptop computer, if necessary.

When a display device according to an embodiment is applied to a mobile terminal, the mobile terminal can include a mobile phone, a smart phone, a laptop computer, a digital broadcast terminal, a personal digital assistant, a portable multimedia player, or a navigation device.

Figure 1:
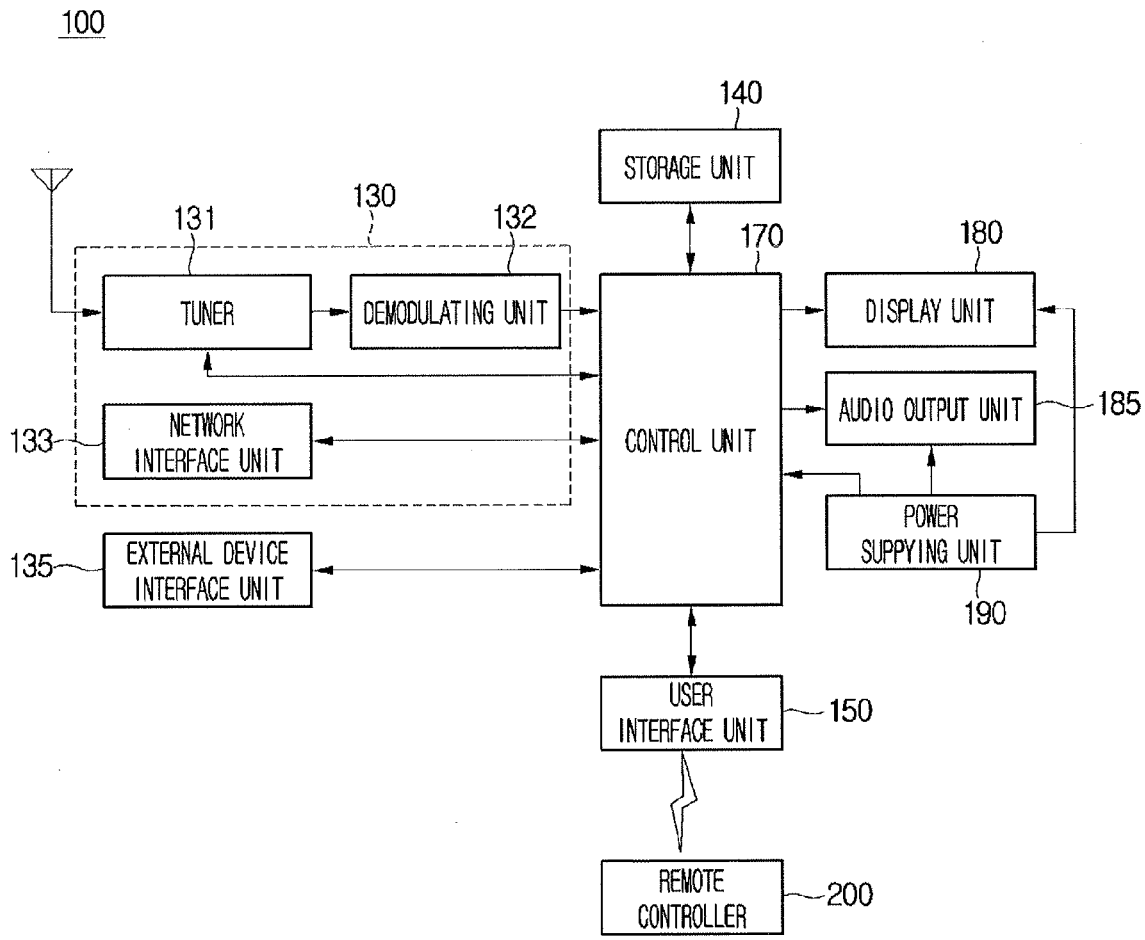
FIG. 1 is a block diagram of a display device according to embodiment of the present invention.

FIG. 1 is a block diagram illustrating a configuration of a display device according to an embodiment of the present invention. Referring to FIG. 1, a display device 100 includes a broadcast receiving unit 130, an external device interface unit 135, a storage unit 140, a user input interface unit 150, a control unit 170, a display unit 180, an audio output unit 185, and a power supplying unit 190. Moreover, the broadcast receiving unit 130 includes a tuner 131, a demodulating unit 132, and a network interface unit 133.

The external device interface unit 135 can receive applications or an application list in an adjacent external device and deliver the applications or the application list to the control unit 170 or the storage unit 140.

The network interface unit 133 provides an interface for connecting the display device 100 to a wired/wireless network including the internet. The network interface unit 133 can transmit or receive data to or from other users or other electronic devices through the connected network or another network linked to the connected network.

Furthermore, the network interface unit 133 can transmit some of media content data stored in the display device 100 to a selected user or a selected electronic device from among other users or other electronic devices pre-registered to the display device 100. The network interface unit 133 can also access a predetermined web page through the connected network or another network linked to the connected network. That is, by accessing the predetermined web page through a network, the network interface unit 133 can transmit or receive data to or from a corresponding server.

In addition, the network interface unit 133 can receive media contents or data provided by a media content provider or a network operator. That is, the network interface unit 133 can receive, through the network, media contents, such as a movie, an advertisement, a game, a VOD, or a broadcast signal, and information related thereto provided from the media content provider or the network operator.

Furthermore, the network interface unit 133 can receive firmware update information and update files provided by a network operator, and transmit data to an internet or media content provider or a network operator. The network interface unit 133 can also select desired applications from among applications opened public and receive the selected applications.

The storage unit 140 can store images, speeches, or data signals processed and stored by programs for signal processing and control in the control unit 170. The storage unit 140 can temporarily store images, speeches, or data signals input from the external device interface unit 135 or the network interface unit 133 and store information on a predetermined image through a channel memory function. The storage unit 140 can also store applications or an application list input from the external device interface unit 135 or the network interface unit 133.

The display device 100 can play media content files (moving picture files, still image files, music files, document files, or application files) stored in the storage unit 140 and provide them to a user.

The user input interface unit 150 can deliver signals input by the user to the control unit 170 or signals from the control unit 170 to the user. For example, the user input interface unit 150 can receive and process control signals such as power on/off, channel selection, screen setting from a remote controller 200 or process and transmit control signals from the control unit 170 to the remote controller 200 according to various communication schemes such as Bluetooth, ultra wideband, Zigbee scheme, radio frequency communication scheme, or an infrared (IR) communication scheme.

Furthermore, the user input interface unit 150 can deliver, to the control unit 170, control signals input by local keys, such as a power key, a channel key, a volume key, or a setting key. An image signal processed by the control unit 170 can be input to the display unit 180 and displayed as an image corresponding to the corresponding image signal. In addition, the image signal processed by the controller can be input to an external output device through the external device interface unit 135.

A speech signal processed by the control unit 170 can be output to the audio output unit 185. The speech signal processed by the control unit 170 can be output to an external output device through the external device interface unit 135.

In addition, the control unit 170 can control overall operations of the display device 100. The control unit 170 can control the display device 100 by user commands input through the user input interface unit 150 or internal programs, and access the network and allow applications or an application list desired by the user to be downloaded to the display device 100.

The controller 170 can allow channel information selected by the user to be output together with the processed image or speech signal through the display unit 180 or the audio output unit 185. In addition, the control unit 170 can allow image signals or speech signals input from an external device, for example, a camera or a camcorder, through the external device interface 135 to be output to the display unit 180 or the audio output unit 185 according to an external device image playing command received through the user input interface unit 150.

Moreover, the control unit 170 controls the display unit 180 so that the display unit 180 displays an image, for example, a broadcast image input through the tuner 131, an external input image input through the external device interface unit 135, an image input through the network interface, or an image stored in the storage unit 140. In this instance, the image displayed on the display unit 180 can be a still image or a moving picture, or a 2-dimensional or 3-dimensional image.

In addition, the control unit 170 can play media content stored in the display device 100, received broadcast media content, or external input media content received from the outside. The media content can have various types, such as a broadcast image, an externally input image, an audio file, a still image, an accessed web screen, and a document file.

The display unit 180 can generate a driving signal by respectively converting an image signal processed by the control unit 170, the data signal, an on-screen-display (OSD) signal, or an image or data signal received by the external device interface unit 135 into an RGB signal.

Further, since the display device 100 illustrated in FIG. 1 is only an embodiment, some of the illustrated elements can be integrated, added, or deleted according to a specification of the display device 100 which is practically implemented.

That is, two or more elements can be integrated into one element, or one element can be subdivided into two or more elements. In addition, a function performed in each block is just for explanation of embodiments, and detailed operation or a device thereof does not restrict the scope of right of the present invention.

According to another embodiment, the display device 100, different from that shown in FIG. 1, does not include the tuner 131 and the demodulating unit, and can receive and play an image through the network interface unit 133 or the external device interface unit 135. For example, the display unit 100 can be implemented by being separated into an image processing device, such as a set top box for receiving a broadcast signal or media contents according to various network services and a media content playback device for playing media content input from the image processing device.

In this instance, an image displaying method to be described hereinafter according to an embodiment can be performed by any one of image processing device such as the separated set top box or the display unit 180 or the media content playback device including the display unit 180 and the audio output unit 185 as well as the display device 100 described in relation to FIG. 1.

Hereinafter, an additional configuration of a display device according to an embodiment is described in relation to FIG. 2. In particular, FIG. 2 is a block diagram illustrating additional elements of a display device according to an embodiment.

Figure 2:
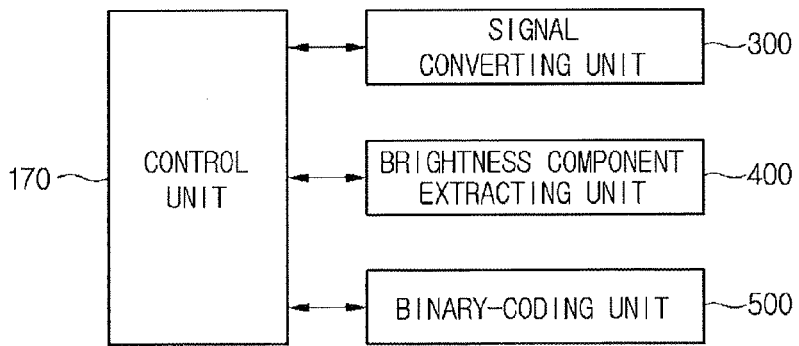
FIG. 2 is a block diagram illustrating additional elements of a display device according to an embodiment of the present invention.

As illustrated in FIG. 2, the display device 100 further includes a signal converting unit 300, a brightness component extracting unit 400 and a binary coding unit 500. The signal converting unit 300 can convert a type of an image input to the display device 100. In an embodiment, when the type of the image input to the display device 100 is a first type, the first type image can be converted into a second type image. For example, when the first type is RGB and the second type is YUV, the signal converting unit 300 can convert the RGB signal into a YUV signal.

The brightness component extracting unit 400 can extract a brightness component from the converted signal by the signal converting unit 300. In an embodiment, when the converted signal is the YUV signal, the brightness component extracting unit 400 can extract only the Y component from the YUV signal.

The binary-coding unit 500 can binary-code the extracted brightness component into a black or white color. In an embodiment, when the brightness component is the Y component, the binary-coding unit 500 can compare a value of the Y component and a reference level value to binary-code the Y component into black or white. Detailed description about this will be provided later.

The control unit 170 can control all elements including the additional configuration of the display device. The control unit 170 can extract document image determination information based on the binary-coded brightness component and determine whether the image input to the display device 100 is a document image by using the extracted document image determination information.

When the input image is determined as a document image through the extracted document image determination information, the control unit 170 can output the color temperature and brightness corresponding to the document image through the display unit 180. When the input image is not confirmed as the document image, the control unit 170 can output the color temperature and brightness corresponding to a general image through the display unit 180.

Figure 3:
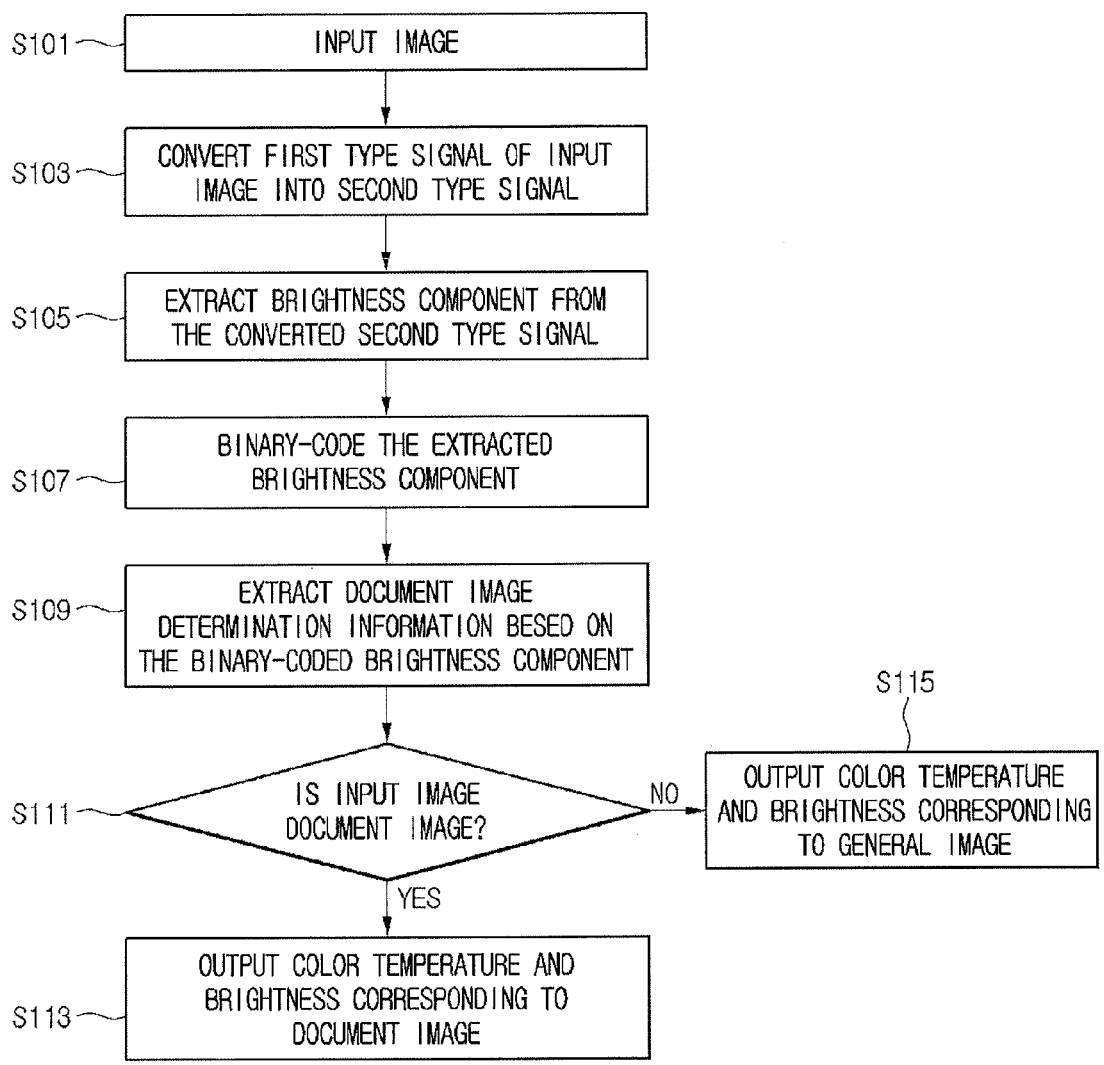
FIG. 3 is a flowchart illustrating an operating method of a display device according to an embodiment of the present invention.

Hereinafter, a display device 100 and an operating method thereof according to an embodiment are descried in relation to FIGS. 3 to 12. In particular, FIG. 3 is a flowchart illustrating a method of operating a display device according to an embodiment.

The control unit 170 of the display device 100 receives an image from the outside (operation S101). In an embodiment, the control unit 170 can receive a broadcast image input through the tuner 131, an external input image input through the external device interface unit 135, or an image input through the network interface unit 133. That is, the control unit 170 can receive various types of images of the broadcast image, the external input image, the audio file, the accessed web screen and the document image from the outside.

Hereinafter, the document image is an image for a text-oriented document file. When a black ratio thereof to be described later is within a reference range and a signal level distribution satisfies a reference distribution, the document image can be recognized as a document image. In addition, other images that an image input to the display device 100 is not a document image are referred to as general images.

The signal converting unit 300 of the display device 100 converts the first type signal of the input image into the second type signal (operation S103). In an embodiment, the first type signal is an RGB signal, and the second type signal can be a YUV signal. The image input to the display device 100 can be configured with a plurality of pixel sets and each of the plurality of pixel sets can be configured with a plurality of pixels.

The signal converting unit 300 can convert the first type RGB signal into the second type YUV signal for each of the plurality of pixel sets or each of the plurality of pixels. Here, YUV is a color representation scheme, which is a type that represents color in 3 pieces of information of luminescence (Y component), a difference between the luminescence and a blue color component (U component), and a difference between the luminescence and red color component. That is, the Y component represents information for the brightness, U and V components represent information for colors.

In an embodiment, a conversion equation for converting the RGB signal into the YUV signal can be $Y=0.3R+0.59G+0.11B$, $U=(B-Y)\times0.493$, $V=(R-Y)\times0.877$, which is just an example. The brightness component extracting unit 400 of the display device 100 extracts the brightness component from the converted second type signal (operation S105). That is, the brightness component extracting unit 400 can extract only the Y component representing information for the brightness among the converted YUV signal. That is, the brightness component can correspond to the Y component of the YUV signal.

The brightness component extracting unit 400 can extract Y component through the above-described conversion equation. The binary coding unit 500 of the display device binary-codes the extracted brightness component into black or white (operation S107). In an embodiment, the binary coding unit 500 can binary-code each of the plurality of pixels forming the input image into black or white on the basis of a value of the extracted brightness component. The binary-coding is a process of representing brightness as black and white for each of the plurality of pixels, and can be a process representing black as 0 and white as 1.

When the brightness component is the Y component of the YUV signal, the binary coding unit 500 can divide and binary-code the Y component of a corresponding pixel into black or white according to whether a value of the extracted Y component is a reference level value or greater. For example, when the Y component value of the corresponding pixel is the reference level value or greater, the binary coding unit 500 represents the corresponding pixel as white. When the Y component value of the corresponding pixel is smaller than the reference level value, the binary coding unit 500 represents the corresponding pixel as black.

In an embodiment, the reference level value is a setting value necessary for binary-coding each pixel and can be set in various schemes. For example, when the Y component value has a level from 0 to 255, a range of the reference level value can be between 10 to 20% levels from the top.

When 25 levels of the top 10% levels from 0 to 255 level is set as the reference level value, and the Y component value of a corresponding pixel is in a range of 25 to 255 level, the corresponding pixel can be binary-coded as white. When the Y component value of the corresponding pixel is in a range from 0 to 25 level, the corresponding pixel can be binary-coded as white.

When 51 levels of the top 20% levels from 0 to 255 level are set as the reference level value, and the Y component value of a corresponding pixel is in a range of 51 to 255 level, the corresponding pixel can be binary-coded as white. When the Y component value of the corresponding pixel is in a range from 0 to 25 level, the corresponding pixel can be binary-coded as black.

Figure 4:
FIGS. 4 and 5 are views illustrating processes of extracting a brightness component from a second type signal and binary-coding the brightness component according to an embodiment of the present invention.
Figure 5:

A process of extracting the brightness component from the second type signal and binary-coding the extracted brightness component in operations S105 and S107 is described in relation to FIGS. 4 and 5. In particular, FIGS. 4 and 5 are views illustrating the process of extracting the brightness component from the second type signal and binary-coding the extracted brightness component according to an embodiment.

FIG. 4 represents an image in state where an original image input to the display device 100 is converted into the second type signal and the brightness component is extracted from the second type signal. In more detail, an output image represented in FIG. 4 represents that the original image input to the display device 100 is converted into a YUV signal and only the Y component is extracted from the converted YUV signal.

FIG. 5 represents a binary-coded image that binary-coding is performed for the output image of FIG. 4. That is, FIG. 5 represents an image in state where each of a plurality of pixels of an output image represented with the Y component is divided into black or white and binary-coded. Here, the display device 100 can compare a Y component value of each of the plurality of pixels forming the output image with the reference level value and represent each pixel as black or white.

Description is provided again in relation to FIG. 3. The control unit 170 of the display device 100 extracts document image determination information based on the binary-coded brightness component (operation S109), and determines whether an image input to the display device 100 is a document image by using the extracted document image determination information (operation S111). The document image determination information can include at least one of a black ratio for the plurality of pixels forming the image input to the display device 100 and a signal level distribution for the plurality of pixels forming the image input to the display device 100.

In an embodiment, the control unit 170 can confirm whether the input image is a document image by extracting a black ratio for the plurality of pixels forming the image input to the display device 100. In more detail, when the extracted black ratio is a reference ratio or greater, the control unit 170 can determine the input image as a document image. When the extracted black ratio is smaller than the reference ratio, the control unit 170 can not determine the input image as a document image. A process for extracting the black ratio for the plurality of pixels forming the image input to the display device 100 and confirming that the input image is a document is described in relation to FIGS. 6 to 11.

FIGS. 6 to 11 are views illustrating a process for extracting the black ratio for the plurality of pixels forming the image input to the display device 100 and confirming that the input image is a document image. In particular, FIGS. 6 to 11 represent images after operation S107 of binary-coding is performed, and each of the images is assumed to be formed of a single pixel set. In addition, the single pixel set includes 216 pixels, which is just an example, and the number of pixels forming a single pixel set can be differently set.

Figure 6:
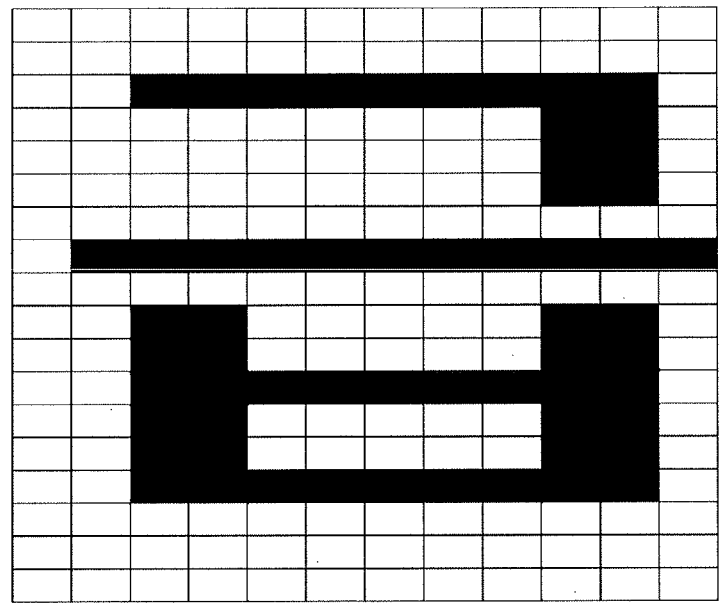
FIGS. 6 to 11 are views illustrating processes of extracting a black ratio for each of a plurality of pixel sets forming an image and confirming whether the image is a document image.

FIG. 6 illustrates a Korean letter image showing binary-coded Korean letter, and the Korean letter image can be configured with total 216 pixels. Since the number of the black pixels among the total pixels of the Korean letter image is 60, the ratio of black pixels to the total pixels is 60/216=0.277. That is, the black ratio of the Korean letter image is approximately 27.7%.

Figure 7:
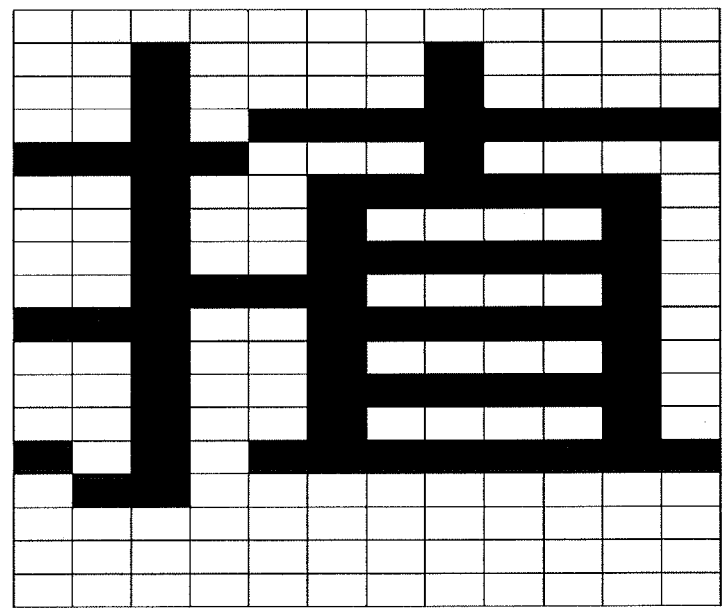

FIG. 7 illustrates a Chinese letter image showing binary-coded Chinese letter, and the Chinese letter image can be configured with total 216 pixels. Since the number of the black pixels among the total pixels of the Chinese letter image is 75, the ratio of black pixels to the total pixels is 75/216=0.347. That is, the black ratio of the Chinese letter image is approximately 34.7%.

Figure 8:
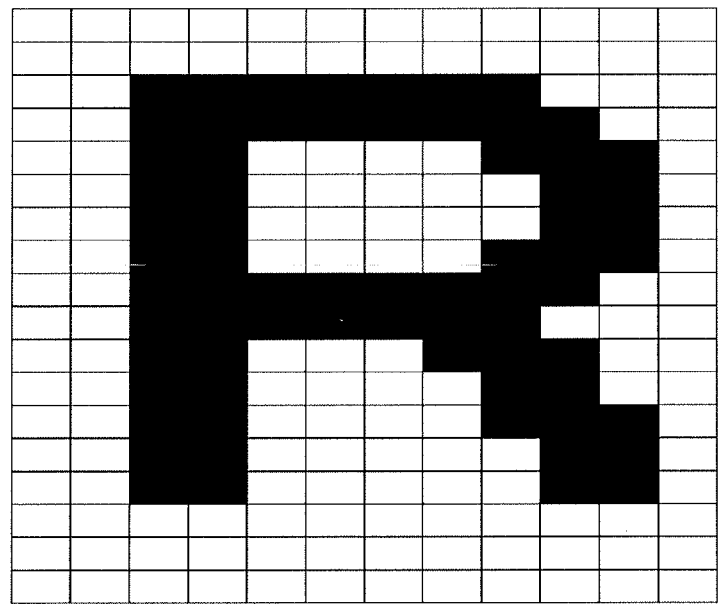

FIG. 8 illustrates an English letter image showing binary-coded English alphabet, and the English letter image can be configured with total 216 pixels. Since the number of the black pixels among the total pixels of the Chinese letter image is 70, the ratio of black pixels to the total pixels is 70/216=0.32. That is, the black ratio of the English letter image is approximately 32%.

Figure 9:
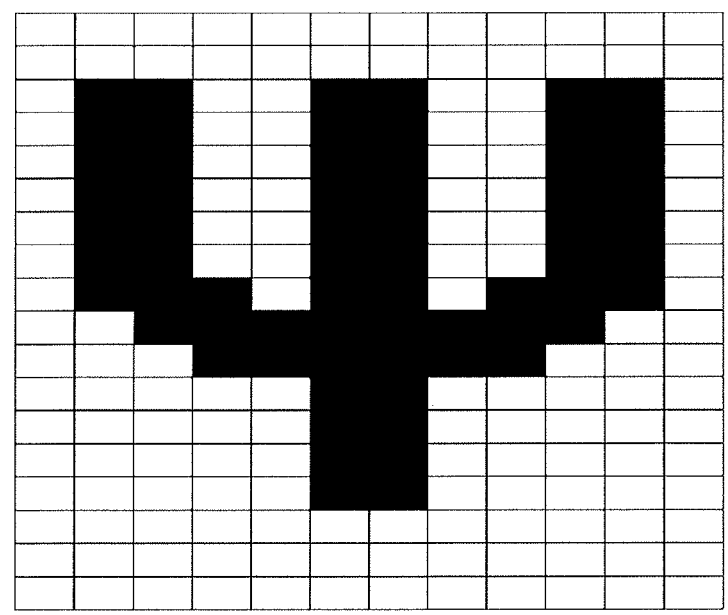

FIG. 9 illustrates a Greek letter image showing binary-coded Greek letter, and the Greek letter image can be configured with total 216 pixels. Since the number of the black pixels among the total pixels of the Greek letter image is 66, the ratio of black pixels to the total pixels is 66/216=0.305. That is, the black ratio of the Greek letter image is approximately 30.5%.

Figure 10:
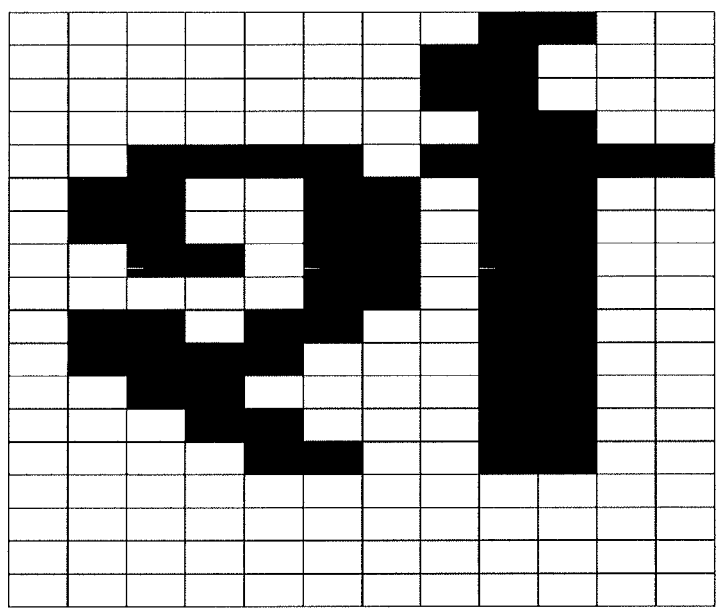

FIG. 10 illustrates a Hindi letter image showing binary-coded Hindi letter, and the Hindi letter image can be configured with total 216 pixels. Since the number of the black pixels among the total pixels of the Chinese letter image is 48, the ratio of black pixels to the total pixels is 48/216=0.22. That is, the black ratio of the Chinese letter image is approximately 22%.

As shown in FIGS. 6 to 10, when 216 pixels are assumed to form a single pixel set and a black ratio representing black based on the single pixel set is in a range of about 0 to about 35%, the control unit 170 can determine that there is a letter in the single pixel set.

Figure 11:
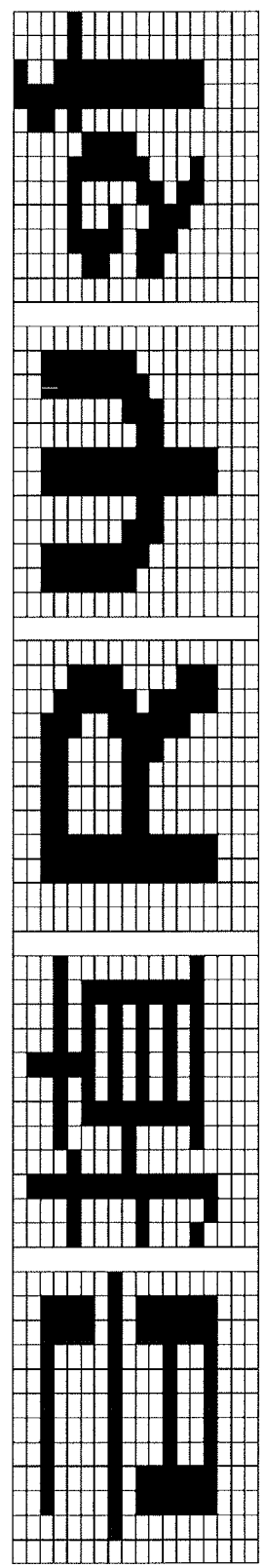

The control unit 170 can extract the black ratio for the image input to the display unit 100 by extracting a black ratio for each of a plurality of pixel sets. For example, FIG. 11 illustrates a document image that the document images of FIGS. 6 to 11 are combined.

The control unit 170 can extract the black ratio for each of the plurality of pixels as shown in FIGS. 6 to 11, and extract the black ratio of the document image by averaging the extracted black ratios. That is, the control unit 170 can extract 29.38% by averaging 27.7%, 34.7%, 32%, 30.5%, and 22%, which are black ratios of each of the plurality of pixel sets. The control unit 170 can extract the black ratio for each of the plurality of pixel sets, obtain an average of the black ratios, In addition, when the average value is in a reference ratio range, determine that the image input to the display device 100 is a document image. In an embodiment, the reference ratio range can be 20 to 35%, which is just an example.

In another embodiment, the control unit 170 can extract a signal level distribution for a plurality of pixels forming the image input to the display device 100 and determine whether the corresponding image is a document image. Each of the plurality of pixels can have a binary-coded brightness component (Y component), and the binary-coded brightness component can have a value of 0 to 255. The signal level distribution for the plurality of pixels forming the image input to the display device 100 can be represented as a histogram, and the control unit 170 can determine whether the corresponding image is a document image based on the signal level distribution represented as the histogram. Description about this is provided in relation to FIG. 12.

Figure 12:
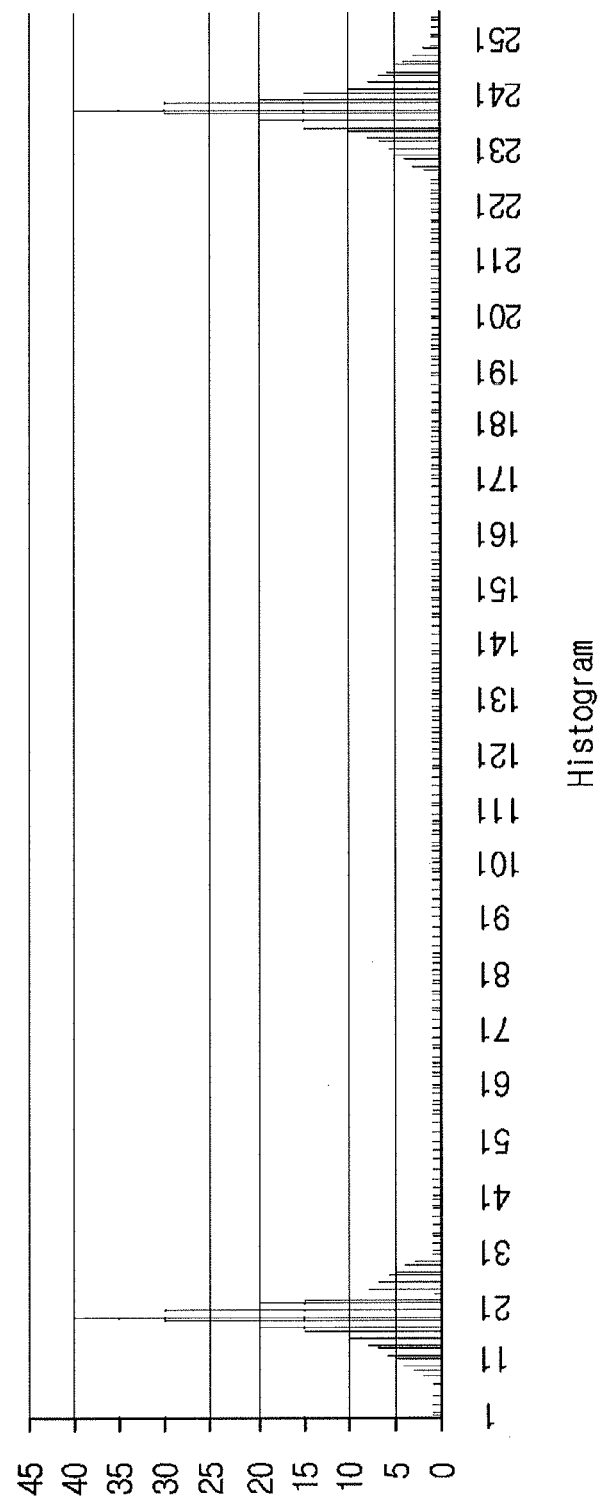
FIG. 12 is a view illustrating a process of extracting a signal level distribution for a plurality of pixels forming an image input to a display device according to an embodiment of the present invention.

FIG. 12 is a view illustrating a process for extracting a signal level distribution for a plurality of pixels forming an image input to a display device according to an embodiment. In particular, FIG. 12 illustrates a signal level distribution as a histogram for a plurality of pixels forming the image input to the display device 100. The x-axis indicates a signal level, and the y-axis indicates the number of pixels corresponding to the corresponding signal level.

The signal level can have a range of 0 to 255. As the signal level has a value towards 0, a pixel becomes darker. As the signal level has a value towards 255, a pixel becomes brighter. Although each of the plurality of pixels forming the image input to the display device 100 is binary-coded as black or white, it can have a grey scale level which is not perfect black or white. That is, the signal level of each pixel forming the corresponding image can have a level of 0 to 255, and the histogram can represent a distribution of pixels corresponding to each signal level.

In another embodiment, the histogram shown in FIG. 12 can be a graph showing a signal level distribution for a plurality of pixels which do not experience the binary-coding process of operation S107. In this instance, each signal level for the plurality of pixels can be a Y component value.

In an embodiment, the signal level distribution of the image input to the display device 100 is in a reference distribution range, the control unit 170 can determine the corresponding image as a document image. A case where the signal level distribution of an image is in the reference distribution range can mean a case where a highest level range and a lowest level range among total signal level ranges respectively have the certain number of pixels. Here, the highest level range can be 0 to 30, and the lowest level range can be 225 to 255.

For example, when the total number of pixels of the image input to the display device 100 is 1000 In addition, among them, 450 pixels belong to the highest level range and 450 pixels belong to the lowest level range, the control unit can determine the signal level distribution of the image is in the reference distribution range. That is, when a ratio of the number of pixels existing in the highest and lowest level ranges over the total number of pixels of the image input to the display device 100 exceeds 90%, the control unit 170 determines that the signal level distribution of the image is in the reference distribution range. Here, the numerical values are just examples.

In another embodiment, the control unit 170 can extract a black ratio for a plurality of pixel sets input to the display device 100, and a signal level distribution for the plurality of pixels and determine whether a corresponding image is a document image. For example, when a black ratio for a plurality of pixel sets forming the image input to the display device 100 is in the reference ratio range, and a signal level distribution for a plurality of pixels is in the reference distribution range, the control unit 170 can determine the corresponding images as a document image.

When a black ratio for a plurality of pixel sets forming the image input to the display device 100 is in the reference ratio range, but a signal level distribution for a plurality of pixels is not in the reference distribution range, the control unit 170 can determine the corresponding image as a general image, which is not a document image.

Furthermore, when a signal level distribution for a plurality of pixels is in the reference distribution range, but a black ratio for a plurality of pixel sets forming the image input to the display device 100 is not in the reference ratio range, the control unit 170 can determine the corresponding image as a general image, which is not a document image.

The display device 100 according to an embodiment can confirm that a corresponding image is a document image even in case where color pictures are included between letters, between sentences, and between paragraphs in an input image. In more detail, when the color pictures are included between letters, between sentences, and between paragraphs in the input image, the control unit 170 can extract brightness component values of a plurality of pixels forming the input image and filter pixels forming the color pictures among entire pixels.

More specifically, since Y component values of the pixels forming the color pictures are relatively greater than those of pixels forming black letters, the control unit 170 of the display device 100 can filter the pixels forming the color pictures by using a pre-set reference level value. After filtering the pixels having greater Y component values than the reference level value, the control unit 170 can extract a black ratio for each of the plurality of pixel sets forming the image and a signal level distribution for a plurality of pixels and determine whether the corresponding image is a document image.

The display device 100 according to an embodiment can confirm whether the corresponding image is a document image even in case where color letters is included among letters in an input image. In more detail, when the color letters are included among the letters in the input image, the control unit 170 can extract brightness component values of a plurality of pixels forming the input image and filter pixels forming the color letters among entire pixels. More specifically, since Y component values of the pixels forming the color letters are relatively greater than those of pixels forming black letters, the control unit 170 of the display device 100 can filter the pixels forming the color letters by using a pre-set reference level value.

After filtering the pixels having greater Y component values than the reference level value, the control unit 170 can extract a black ratio for each of the plurality of pixel sets forming the image and a signal level distribution for a plurality of pixels and determine whether the corresponding image is a document image.

The display device 100 according to an embodiment can confirm whether a corresponding image is a document image even in case where shapes and sizes of letters in an input image are varied. In more detail, when the shapes and sizes of the letters in the input image are varied, the control unit 170 can extract black ratios of a plurality of pixel sets forming the input image, and obtain ratios of pixels representing black among the entire pixels by averaging the extracted black ratios. When the shapes and sizes of the letters in the image are varied, but the black ratio is in a reference ratio range and the signal level distribution is in the reference distribution range, the display device 100 can determine the corresponding image as a document image.

The control unit 170 of the display device 1100 can filter pixels forming color letters whose Y component values are greater than a reference level by using the preset reference level. After filtering the pixels whose Y component values are greater than the reference level, the control unit 170 can extract black ratios for a plurality of pixel sets forming an image and a signal level distribution for a plurality of pixels and determine whether the corresponding image is a document image.

When the input image is determined as a document image through the extracted document image determination information (operation S111), the control unit 170 can output the color temperature and brightness corresponding to the document image on the display unit 180 (operation S113). Here, the color temperature indicates a light from an optical source in number, the storage unit 140 of the display device 100 can store the color temperatures and brightness corresponding to document images. Furthermore, the storage unit 140 can store the color temperatures and brightness of general images, which are not document images. For example, the color temperature corresponding to a document image can be 5200K and the color temperature corresponding to a general image can be 4100K, which are just examples.

In an embodiment, the color temperature and brightness corresponding to a document image can be set by a user or preset during designing a product. When an image input to the display device 100 is changed from a general image to a document image, the control unit 170 can change the color temperature and brightness corresponding to a general image into those of a document image and output the changed the color temperature and brightness.

According to various embodiments, since the display device 100 provides a document image having optimally viewed the color temperature and brightness, a user can see the document image in an optimized state. Accordingly, the user can reduce eyestrain. Further, when the input image is not determined as a document image, the control unit outputs the color temperature and brightness corresponding to a general image through display unit 180 (operation S115).

According to an embodiment, an operation method of the above-described can also be embodied as processor readable codes on a program recorded medium. Examples of the processor readable recording medium include read-only memory (ROM), random-access memory (RAM), CD-ROMs, magnetic tapes, floppy disks, and optical data storage.

According to various embodiments, it can be efficiently determined whether an image input to a display device is a document image. Furthermore, since a document image is provided which has the color temperature and brightness optimized to see, a user can see the document image in its optimized state, thereby reducing eyestrain.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

What is claimed is:

1. A method of controlling a display device, the method comprising:

receiving, via a receiving unit of the display device, an input image externally;

converting, via a signal converting unit of the display device, a first type signal of the input image into a second type signal;

extracting, via a brightness component extracting unit of the display device, a brightness component from the converted second type signal;

determining, via a controller, whether the input image to the display device is a document image based on the brightness component; and outputting, via the controller, a color temperature and brightness set corresponding to the document image if the input image is determined as the document image.

2. The method according to claim 1, further comprising:

extracting, via the controller, document image determination information based on the extracted brightness component; and determining, via the controller, whether the input image to the display device is the document image based on the document image determination information, wherein the extracting of the document image determination information includes extracting black ratios for a plurality of pixels forming the input image and a signal level distribution for the plurality of pixels forming the input image.

3. The method according to claim 2, wherein the determining of whether the input image is the document image includes, when the extracted black ratios for the plurality of pixels are in a reference ratio range and the extracted signal level distribution for the plurality of pixels is in a reference distribution range, determining the input image as the document image.

4. The method according to claim 3, wherein the extracting of the signal level distribution includes extracting the signal level distribution based on a histogram which represents a number of signal levels and a number of pixels corresponding to each of the plurality of pixel levels.

5. The method according to claim 2, further comprising:
binary-coding the extracted brightness components.

6. The method according to claim 5, wherein the extracting of the black ratios for the plurality of pixels forming the input image includes extracting the black ratios based on the binary-coded brightness components.

7. The operation method according to claim 5, wherein the binary-coding of the extracted brightness components includes, when color pictures are included between letters, between sentences, and between paragraphs in the input image and the input image includes color letters, comparing brightness component values of the pixels forming the color pictures with a reference level and filtering pixels forming the color pictures and pixels comprising the color letters according to the comparison results.

8. The operation method according to claim 1, wherein the first type signal is an RGB signal and the second type signal is YUV signal.

9. The operation method according to claim 8, wherein the extracting of the brightness component from the converted second type signal comprises extracting the Y component from the YUV signal.

10. A display device, comprising:
a display unit;
a signal converting unit configured to convert a first type signal of an externally received input image into a second type signal;

a brightness component extracting unit configured to extract a brightness component from the converted second type signal; and a controller coupled with the display unit, the signal converting unit and the brightness component extracting unit, the controller configured to output a color temperature and brightness set corresponding to a document image if the input image is determined as a document image based on the brightness component.

11. The display device according to claim 10, wherein the controller is further configured to:
   extract document image determination information based on the brightness component;
   determine whether the input image is the document image based on the document image determination information, and
   wherein the document image determination information includes black ratios for a plurality of pixels forming the input image and a signal level distribution for the plurality of pixels.

12. The display device according to claim 11, wherein when the extracted black ratios for the plurality of pixels are in a reference ratio range and the extracted signal level distribution for the plurality of pixels is in a reference distribution range, the control controller is further configured to determine the input image as the document image.

13. The display device according to claim 12, wherein the controller is further configured to extract the signal level distribution based on a histogram which represents a number of signal levels and a number of pixels corresponding to each of the plurality of pixel levels.

14. The display device according to claim 11, further comprising:
   a binary-coding unit configured to binary-code the extracted brightness components.

15. The display device according to claim 14, wherein the controller is further configured to extract the black ratios for the plurality of pixels based on the binary-coded brightness components.

16. The display device according to claim 10, wherein the first type signal is an RGB signal and the second type signal is YUV signal.

17. The display device according to claim 16, wherein the extracting of the brightness component from the converted second type signal includes extracting the Y component from the YUV signal.

* * * * *